(No Model.)
H. N. STARR.
BICYCLE.
No. 328,353. Patented Oct. 13, 1885.
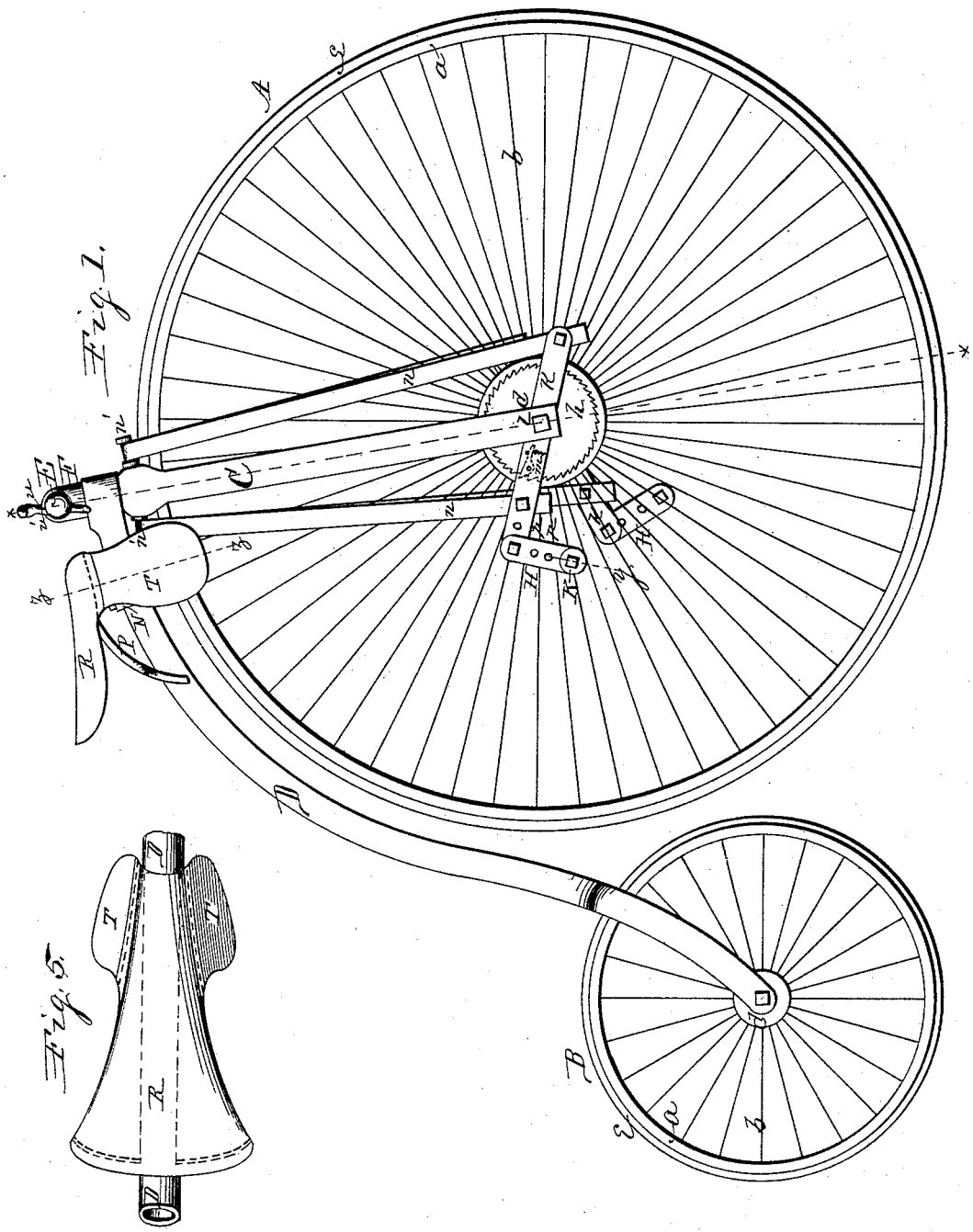

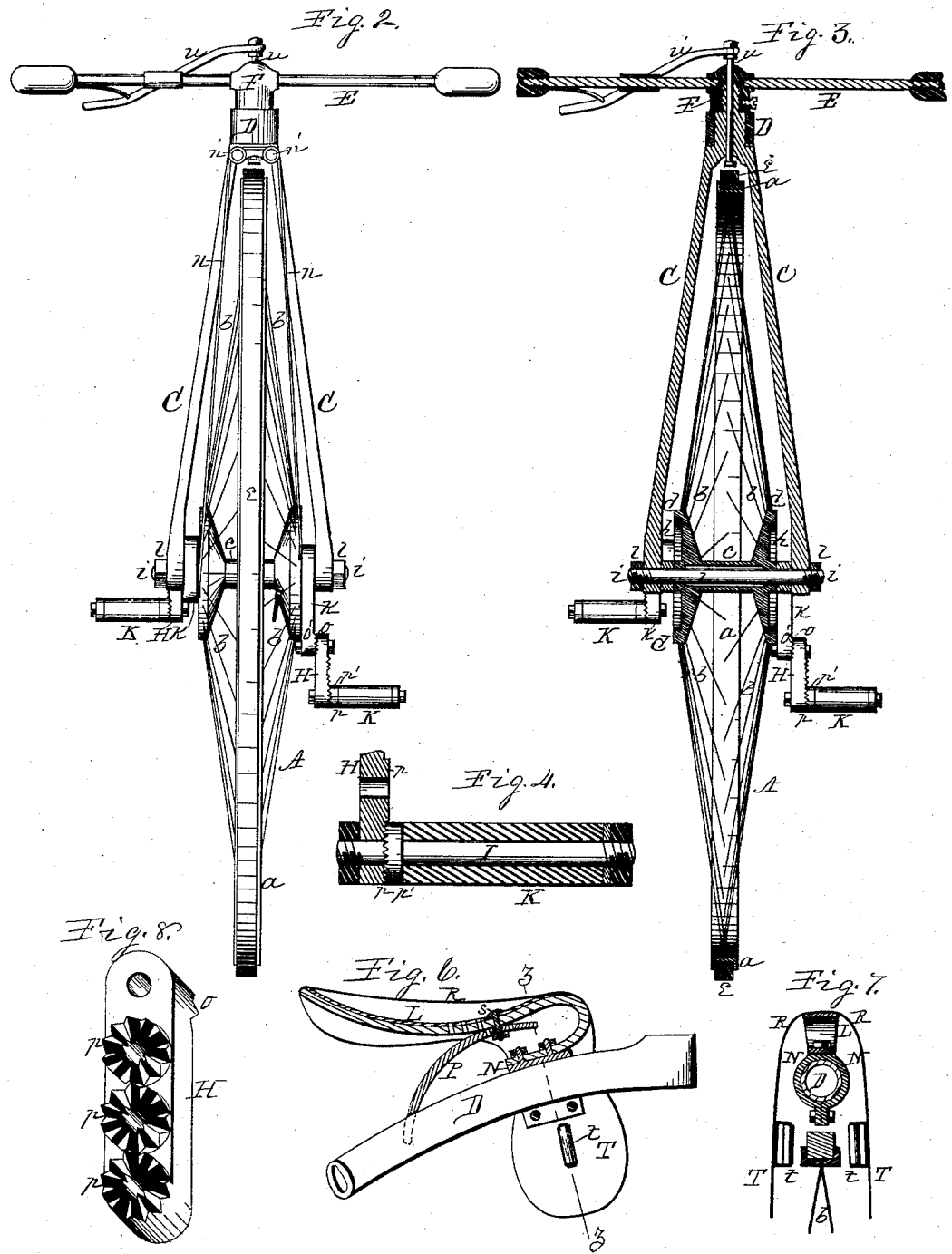

UNITED STATES PATENT OFFICE.

HENRY N. STARR, OF ROCKFORD, ILLINOIS, ASSIGNOR TO ROBERT P. SCOTT, OF BALTIMORE, MARYLAND.

BICYCLE.

SPECIFICATION forming part of Letters Patent No. 328,353, dated October 13, 1885.

Application filed July 25, 1884. Serial No. 138,778. (No model.)

*To all whom it may concern:*

Be it known that I, HENRY N. STARR, a citizen of the United States, residing in the city of Rockford, in the county of Winnebago and State of Illinois, have invented a new and useful Bicycle, of which the following is a specification.

The object of this invention is to produce a bicycle capable of use by persons of various heights, to put the throw of the pedals under the control of the rider, and to prevent the wheel coming in contact with the leg of the rider in running curves. These and other improvements, all of which will be hereinafter more fully described, constitute the subject-matter of this specification.

In the accompanying drawings, Figure 1 is a side elevation of a bicycle embodying my invention. Fig. 2 is a front elevation. Fig. 3 is a transverse vertical section on dotted line $x$ on Fig. 1. Fig. 4 is a central section of the pedal on dotted line $y$ on Fig. 1. Fig. 5 is a plan view of the saddle. Fig. 6 is a vertical central section through the saddle lengthwise. Fig. 7 is a transverse section on dotted line 3 on Figs. 1 and 6; and Fig. 8 is an isometrical representation of a portion of the pedal-connection.

In the figures, A and B represent the supporting-wheels, which are of the tension variety. The outer rims, $a$, of these wheels are produced in channel-iron, and are bored at proper intervals to receive the wire-rod spokes $b$, and the spoke-holes are countersunk on the outer face of the rim to receive the countersunk heads of the wire-rod spokes $b$. The hubs of these wheels are of spool form, consisting of a tubular shaft, $c$, and head ends $d$. These head ends $d$ are bored at proper intervals to correspond to the spoke-holes of the rim of the wheel, and are screw-threaded internally to receive the inner screw-threaded ends of the wire-rod spokes $b$. The wire-rod spokes $b$ are passed through the holes in the channel-iron rim, and their screw-threaded ends are turned into the screw-threaded holes in the spool-heads $d$ of the hub with a force sufficient to fix the rim in a proper position concentric with the hub.

At $e$ is represented an elastic tire or band, rectangular in section, preferably of rubber properly vulcanized, and of proper dimensions to enter snugly within the flanged sides of the channel-iron rims of the wheels. This elastic tire or band $e$ may be produced with a convex outer surface or tread instead of the square form shown in the figures. The outer end faces of the spool-heads of the front supporting-wheel, A, are recessed, as shown at $h$, and the internal surfaces of the rim forming the recess are produced in saw-toothed ratchet form, for a purpose to be hereinafter described.

At C is represented a yoke employed to span the front supporting-wheel. Its upper end is swivel-jointed to the forward end of a curved coupling-bar or backbone, D, and the rear end of the backbone is produced in yoke form to span the rear supporting-wheel, with which it is connected by an axial bolt extending through the axial center of the wheel and end portions of the backbone yoke-arms. This yoke C and backbone D, and their connections with each other, and the connection of the backbone with the rear carrying-wheel, also the guiding-bar E and its cap F and their connections with each other and with the yoke C, are substantially the same in their construction and application as like parts to be found in like machines now in use.

At $i$ is represented a journal-bar fitted to the axial center opening of the hub of the front carrying-wheel, and like openings in the pedal-levers $k$ and lower ends of arms of the yoke C, and its outer ends are screw-threaded and receive the screw-nuts $l$, which serve to fix the parts in a free manner to permit of the required rotary movements of the parts offering the least resistance.

The pedal-levers $k$ are provided on their inner face with a pivoted spring-actuated pawl, $m$, (represented in dotted lines in Fig. 1,) in position thereon to engage the saw-toothed ratchet $h$, formed in the recessed ends of the front wheel-hub in such a manner that the downward movement of the rear end of the levers $k$ will carry the pawls over the teeth of the ratchets, and in their upward movements the pawls will engage the ratchet-teeth and cause the carrying-wheel to rotate. These pedal-levers $k$ are connected in this instance by means of suitable belts, $n$, supported on rollers $n'$, mounted to revolve on stud-journals projecting from the front and rear portions of the yoke $c$, at or near the junction of its depending legs. These belts $n$, from their support on the rollers, depend on both sides of the wheel, one in front and the other in rear of the yoke $c$, and their lower ends are connected to the forward and rear arms of the levers $k$, equidistant from the fulcrum center of the levers, in such a manner that the depression of the rear end of one of the levers will lift the rear end of the other lever on the opposite side of the wheel. By this construction it will be seen that in the upward movement of the rear ends of the levers $k$ the spring-actuated pawl $m$ will engage the ratchets in the recesses $h$ in the spool-heads of the hub and cause the wheel to revolve forward.

At H are represented pendent arms, having the upper ends of their inner face at $o$ produced in rose-ratchet form to engage a corresponding rose-ratchet, $o'$, on the rear end outer face of the levers $k$, and a clamping screw-bolt passed through the axial centers of the parts serves to fix them to each other in an adjustable manner to permit the pendants H to be placed at any required angle relatively with the lever. These pendants H are provided on their outer face at equal intervals with rose-ratchets $p$.

At I are represented pedal-spindles fitted with a collar, $p'$, having its outer face produced in rose-ratchet form to engage the rose-ratchets on the outer face of the pendants. The end of the spindle projecting from the rose-ratchet face of the collar is fitted to enter the bored axial centers of the rose-ratchets on the pendants, and their end portions are screw-threaded and fitted with a screw-clamping nut to fix them in place on the pendants in a manner to permit the spindle to be adjusted to any of the rose-ratchets on the outer face of the pendants, and in any position thereon.

At K is represented a tubular cylindrical rubber pedal, placed on the outer portion of the pedal-spindle between the collar $p'$ and a screw-nut on the outer end of the pedal-spindle, which screw-nut serves to clamp the rubber pedal against the collar $p$ and hold it in place on the spindle.

At L is represented a spring saddle-tree produced in the curved form represented, having its rear free end provided with a curving transverse bar, as shown in the dotted lines in Fig. 5.

At N is represented a clasp fitted to embrace the backbone of the vehicle, on which it is made adjustable and held in position thereon when adjusted by means of clamping-screws passed through the depending arms of the clasp. To this clasp N the spring saddle-tree L is fixed by means of screw-bolts rising from the upper face of the clasp and extending through the under rearward-curving arm of the spring saddle-tree.

At P is represented a supplementary spring having its forward end provided with a series of bolt-holes, which, in connection with a series of bolt-holes in the spring saddle-tree, receive a clamping-bolt, $s$, which serves to fix the spring P to the spring saddle-tree L, and in connection with the holes in the tree and supplementary spring furnish the means for the forward and rearward adjustment of the supplementary spring to vary the spring action of the saddle-tree. The rear free end of the supplementary spring P is produced in forked or branching form to span the backbone of the vehicle, to slide thereon to permit the spring to render under the weight of the rider.

The saddle-tree is fitted with a suitable covering, R, preferably of leather, fixed to the forward and rear end portions of the spring-tree, spanning the curved upper portion thereof, producing a flexible saddle-seat. This saddle is provided with side flaps, T, depending from the seat on each side of the wheel in position to receive the leg of the rider to protect the clothing from the action of the wheel in running curves.

At $t$ is represented an anti-friction roller supported to revolve in suitable bearing fixed to the inner side of the side flaps in position thereon to engage the rim of the front wheel in running curves to prevent the frictional contact of the wheel and side flaps of the saddle.

The upper end of the yoke C is provided with an axial opening boxed to receive a piston-rod, $u$, fitted at its lower end with a suitable brake-shoe to engage the periphery of the front carrying-wheel.

At $u'$ is represented a spring-actuated lever having a central pivotal connection with the guiding-bar E, in such position thereon that its inner end will connect the upper end of the piston-rod $u$, and its outer end will be in position to be operated by the hand of the rider to hold the brake-shoe in contact with the peripheral rim of the front carrying-wheel to retard the movement thereof when required.

From the foregoing it will be seen that by the construction and arrangement of the saddle-tree it may be readily adjusted to the weight of the rider to produce the best spring action, and by means of its connections with the backbone is made readily adjustable thereon to place the rider in the proper position on the vehicle.

It will further be seen that by means of the adjustable connection of the foot-pedals with the levers they may be readily adjusted to adapt the machine to the use of persons varying in size. It will still further be seen that by this construction and arrangement of the foot-pedals and their connection with the driving-wheel that the throw of the pedals is placed under the control of the rider to vary the stroke at his pleasure, and that in descending grades by the action of gravity the feet of the rider may be supported upon the pedals at rest and the movement of the vehicle controlled by the brake.

In this instance I have employed belts to connect the pedal-levers on opposite sides of the machine; but instead thereof a metallic ribbon or a wire cable or other equivalent device may be employed, and instead of the pawl and ratchet any of the known forms of friction or silent clutching mechanism may be employed.

I claim as my invention—

1. The combination, with the front wheel supported to revolve within the yoke, of pedal-levers having a fulcrum-support to oscillate on the axial center of the wheel and provided with clutch mechanism to engage the wheel, and belts secured at their ends to said levers, substantially as set forth.

2. The combination, with the front wheel, whose hub is recessed and toothed, as described, of pedal-levers fulcrumed to oscillate on the axial center of the wheel and provided with spring-pawls to engage the teeth of the wheel-hub, substantially as set forth.

3. The combination, with the pedal-levers, of a belt connecting their forward arms and a belt connecting their rear arms on opposite sides of the vehicle, said belts supported upon rollers at or near the junction of the yoke-arms, substantially as and for the purpose set forth.

4. The combination, with the pendants having an adjustable connection with the pedal-levers, of pedals having an adjustable connection with the pendants, substantially as and for the purpose set forth.

5. The herein-described spring saddle-tree, consisting of an upper curved spring-bar with forward end portion curving under rearward and a curving transverse bar at its rear end, a supplementary spring having an adjustable connection with the upper bar, and its free end forked to embrace the coupling-bar of the vehicle, substantially as and for the purpose set forth.

6. The combination, with the depending saddle-flaps, of an anti-friction roller, substantially as and for the purpose set forth.

HENRY N. STARR.

Witnesses:
A. O. BEHEL,
JACOB BEHEL.